United States Patent
Akella et al.

(10) Patent No.: US 8,509,237 B2
(45) Date of Patent: Aug. 13, 2013

(54) ARCHITECTURE AND SYSTEM FOR COORDINATED NETWORK-WIDE REDUNDANCY ELIMINATION

(75) Inventors: Srinivasa Aditya Akella, Middleton, WI (US); Ashok Anand, Madison, WI (US); Vyas Sekar, Pittsburgh, PA (US)

(73) Assignee: Wisconsin Alumni Research Foundation, Madison, WI (US)

( * ) Notice: Subject to any disclaimer, the term of this patent is extended or adjusted under 35 U.S.C. 154(b) by 544 days.

(21) Appl. No.: 12/492,749

(22) Filed: Jun. 26, 2009

(65) Prior Publication Data

US 2010/0329256 A1    Dec. 30, 2010

(51) Int. Cl.
*H04L 12/28* (2006.01)
*H04L 12/56* (2006.01)

(52) U.S. Cl.
CPC ....................................... *H04L 45/00* (2013.01)
USPC .......................................... 370/392; 370/389

(58) Field of Classification Search
None
See application file for complete search history.

(56) References Cited

U.S. PATENT DOCUMENTS

| | | | |
|---|---|---|---|
| 6,229,823 B1 * | 5/2001 | Scarmalis | 370/477 |
| 6,300,887 B1 * | 10/2001 | Le | 341/60 |
| 7,058,728 B1 * | 6/2006 | Eklund | 709/247 |
| 2001/0030963 A1 * | 10/2001 | Yoshimura et al. | 370/393 |
| 2002/0001315 A1 * | 1/2002 | Tran et al. | 370/475 |
| 2004/0107298 A1 * | 6/2004 | Westphal | 709/247 |
| 2005/0018615 A1 * | 1/2005 | Itoh et al. | 370/252 |
| 2005/0195750 A1 * | 9/2005 | Le et al. | 370/252 |
| 2005/0207408 A1 * | 9/2005 | Elliott | 370/389 |
| 2006/0010003 A1 * | 1/2006 | Kruse | 705/1 |
| 2006/0104266 A1 * | 5/2006 | Pelletier et al. | 370/389 |
| 2008/0294779 A1 * | 11/2008 | Gkantsidis et al. | 709/226 |
| 2009/0016342 A1 * | 1/2009 | Miyazaki et al. | 370/389 |
| 2009/0089454 A1 * | 4/2009 | Huggahalli et al. | 709/247 |
| 2009/0190522 A1 * | 7/2009 | Horn et al. | 370/315 |
| 2009/0207854 A1 * | 8/2009 | Blanchard et al. | 370/466 |
| 2009/0219930 A1 * | 9/2009 | Dolganow et al. | 370/389 |
| 2010/0226385 A1 * | 9/2010 | Rochon et al. | 370/419 |

* cited by examiner

*Primary Examiner* — Ayaz Sheikh
*Assistant Examiner* — Peter Chau
(74) *Attorney, Agent, or Firm* — Boyle Fredrickson S.C.

(57) ABSTRACT

A network employing redundancy-aware hardware may actively allocate decompression tasks among different devices along a single path to improve data throughput. The allocation can be performed by a hash or similar process operating on a header of the packets to distribute caching according to predefined ranges of hash values without significant additional communication overhead. Decompression of packets may be similarly distributed by marking shim values to match the earlier caching of antecedent packets. Nodes may use coordinated cache sizes and organizations to eliminate the need for separate cache protocol communications.

15 Claims, 4 Drawing Sheets

ARCHITECTURE AND SYSTEM FOR COORDINATED NETWORK-WIDE REDUNDANCY ELIMINATION

This invention was made with United States government support awarded by the following agency:

NSF 0746531, 0626889

The United States government has certain rights in this invention.

CROSS REFERENCE TO RELATED APPLICATIONS

Not applicable

BACKGROUND OF THE INVENTION

The present invention relates to computer networks and, in particular, to architectures and devices for increasing the effective network bandwidth.

Computer networks provide for the exchange of digital data among computers over a variety of media including electrical cable, optical fiber, and radio links. Commonly, the data is broken into data packets each provided with a header indicating a destination for the packet and a packet sequence number. The packets are forwarded over a complex and changing network topology through the agency of "routers" which read the packet headers and forward the packets on particular links to other routers according to a router table. At the destination, the packets are reassembled.

The term "router" as used herein will refer broadly to any network node processing data packets for the purpose of communicating them through a network and may include hubs, switches, and bridges as well as conventional routers.

The bandwidth of a network is a general measure of the rate of data transfer that can be obtained. Limits on bandwidth can result from physical limitations in the media of the links between nodes, for example, caused by the impedance of electrical conductors, as well as from processing limitations of the node hardware such as limitations of processor speed or memory capacity. While bandwidth limitations can generally be addressed by over-provisioning the network (e.g. adding additional links and faster hardware) these measures can be costly. Increased demand for high bandwidth content (e.g. video) and the importance of accommodating highly variable network traffic, for example "flash crowds", makes it desirable to find ways to increase the bandwidth efficiency of existing networks.

The effective bandwidth of the network may be effectively increased by a number of software techniques. "Traffic engineering" may be used to allocate the routing of data to spread the load evenly across network links by central control of the routing tables or the like. This technique, by eliminating congestion, improves the effective bandwidth of the network. Traffic engineering can be limited, however, by the difficulty of anticipating rapid variation in traffic volumes and coordinating spatially separate routers.

Data compression can also be used to increase the effective bandwidth of the network. Thus, for example, video can be compressed using an MPEG compression system to significantly decrease the amount of data required to support a video transmission.

Application layer caching can also be used to improve the effective bandwidth of a network by taking commonly used network data and placing it in proxy caches at various locations on the network. The proxy caches limit the need to transmit the data over the network when it is subject to separated requests.

Improved network capacity can also be provided by monitoring and removing packet-level redundancy, for example, at network routers or hardware "middleboxes" attached to routers. Such systems will be termed "redundancy-aware devices" and generally operate independently of the application layer by inspecting packets for redundancy, removing the redundant strings from the packets (henceforth referred to as "compression" or "encoding"), and allowing the removed material to be reconstructed at a downstream cache (referred to as "decompression" or "decoding"), before it is forwarded to the intended destination. The removal and reconstruction is transparent to the source and destination end-systems and requires no separate upgrades to the end-systems.

SUMMARY OF THE INVENTION

The present inventors have recognized that the throughput of redundancy-aware devices, and hence the effective improvement in network capacity, can be substantially increased by intelligently allocating compression and decompression responsibilities across a network of devices. This allocation accommodates the asymmetry between the processing time required for compressing packets and decompression packets (driven largely by differences in the required number of memory accesses), spreads caching responsibilities to better utilize the available memory resources, and better addresses "bottlenecks" caused by network topology or changing traffic patterns. Significantly, packet caching and decompression need not be performed at the downstream node immediately adjacent to the compressing node. This has two advantages. First, this avoids a repeated sequence of compression-decompression actions along a series of routers, which is especially important since compression is a resource-intensive operation. Second, it magnifies the benefits of each decompression action, in that each decompression saves the transfer of content across several router-hops in the network.

Specifically, the present invention provides an apparatus for reducing redundant network transmissions in a network having a compressing node and one or more decompressing nodes along a transmission path from the compressing node. The compressing node marks the compressed packets for decompression at one of the first and second decompressing nodes, to spread the computational task of decompressing redundant packets among the first and second decompressing nodes. While marking, the compressing node may consider that the allocated node for decompression would have antecedent packet in its store to decompress the packet. The first and second decompressing nodes selectively decompress packets marked for the given first or second decompressing node.

It is thus a feature of a least one embodiment of the invention to distribute decompression tasks among nodes for improved load sharing and increased throughput.

The first and second decompressing nodes may selectively store antecedent packets identified by using a predefined rule based on data in the antecedent packets and allocate storage of the antecedent packets among the first and second decompressing nodes. The compressing node may compress redundant packets by identifying portions of each given redundant packet that are redundant with a given stored antecedent packet previously passing through the compressing node and the compressing node may mark the given compressed redundant packets for decompression at a given decompressing node previously storing the antecedent packet according to the predefined rule.

It is thus a feature of a least one embodiment of the invention to allocate caching burdens associated with compression among different nodes by using preexisting data of the packets.

The predefined rule may assign a range to each of the first and second decompressing node and hash the header data of the antecedent packets, storing those antecedent packets whose hash falls with in the range assigned to the node. When ranges are overlapping, an antecedent packet can be stored in more than one decompressing node, and the compressing node can mark the given packet, redundant with the antecedent packet, for decompression at any one of the decompressing nodes storing the antecedent packet.

It is thus a feature of a least one embodiment of the invention to provide a simple allocation system that admits to adjustment of caching and decompression burdens by a simple adjustment of hash ranges.

The invention may employ a supervisory node connecting for communication with the compressing and decompressing nodes; the supervisory node providing data to the connected nodes to control the predefined rule according to capabilities of the compressing node and the decompressing nodes.

It is thus a feature of a least one embodiment of the invention to permit dynamic changes to the predefined rule to accommodate historical and current patterns in network traffic, information about the nodes' hardware capabilities, for example memory capacity or memory speed or processor speed.

The supervisory node may take into account different types of suitable network-wide objectives specified by a network operator, along with the prevailing traffic and resource conditions, and optimize these objectives while controlling the allocations.

It is thus a feature of a least one embodiment of the invention to allocate responsibilities to different devices to suitably optimize different operator-specified objective functions, while respecting the resource constraints of the devices.

Instead of a predefined rule for the decompressing nodes, the compressing node may also decide at runtime which decompressing nodes should store a given packet. The compressing node can indicate that using/adding extra bits in the packet header.

The compressing node may excise multiple portions of a given redundant network packet, the portions redundant with different antecedent network packets, and may mark the given redundant network packet for decompression of different portions at different of the first and second decompressing nodes.

It is thus a feature of a least one embodiment of the invention to permit the allocation of decompression tasks for a single packet among multiple decompressing nodes.

The compressing node may include a table, or its logical equivalent, describing the connection topology of the first and second nodes for each transmission path connected to compressing node. The compressing node may check the table to ensure that the first and second decompressing nodes for the compressed packet are on the same transmission path and not compress different portions of the compressed packet for decompression at both the first and second nodes if the first and second decompressing nodes are not on the same transmission path. The compressing node may also check the table to ensure that the compressed packet can be decompressed along the transmission path, when the compressed packet and the corresponding antecedent packet have different transmission paths.

It is thus a feature of a least one embodiment of the invention to provide a mechanism for preventing decompression that would require the single compressed packet to traverse divergent paths from the compressing node.

The compressing node may include a first storage area for storing portions of antecedent packets also for storage at the first decompressing node and a second storage area for storing portions of antecedent packets also for storage at the second decompressing node so that the first and second decompressing nodes have storage areas equal in size to the first storage area and second storage area respectively, whereby ejection of stored data caused by overflow of the storage areas of the compressing node causes synchronous ejection of stored data in the respective storage areas of the first and second decompressing nodes.

It is thus a feature of a least one embodiment of the invention to provide coordination between limited cache resources on separate nodes without the need for independent cache coordination signals between the compressing and decompressing nodes.

A decompressing node may be on the transmission path from at least a first and second compressing node and the first and second compressing nodes may include storage areas for storing portions of antecedent packets marked for storage at the decompressing node. The decompressing node may have first and second storage areas equal in size to the storage areas of the first and second compressing nodes respectively whereby ejection of stored data caused by overflow of the storage areas of the compressing nodes causes synchronous ejection of stored data in the respective storage areas of the decompressing node.

It is thus a feature of a least one embodiment of the invention to permit a single decompressing node to coordinate its cache structure with multiple compressing nodes, again without communication of ancillary data.

The decompressing node may provide decompression of redundant packets only with respect to uncompressed portions of antecedent packets. Analogously, the compressing node may only compress packets with respect to uncompressed portions of antecedent packets.

It is thus a feature of a least one embodiment of the invention to avoid problems of decompressing data at decompressing nodes using cached data at the decompressing node that is not fully decompressed.

The compressing node and the first and second decompressing nodes may be components of network routers or may be non-router middle boxes attached to a single network linecard.

It is thus a feature of a least one embodiment of the invention to provide a system that may be flexibly integrated into different network devices.

This architecture can be extended to multiple compressing nodes on a transmission path, where caching and compression responsibilities are distributed across different compressing nodes, similar to the manner in which the caching and decompressing responsibilities are distributed across decompressing nodes. The decompressing node can have storage area, per compressing node, per transmission path, and similar techniques can be used for coordinating the cache structure without any independent communication.

It is thus a feature of a least one embodiment of the invention to provide a system that may have multiple compressing devices on a network path.

The above architecture can also be applied to other types of redundancy-aware devices that may compress traffic contents more generally at conceptual "object" rather than physical packet granularities.

It is thus a feature of a least one embodiment of the invention to provide a system that may compress and decompress traffic contents at different logical granularities.

These particular objects and advantages may apply to only some embodiments falling within the claims and thus do not define the scope of the invention.

DETAILED DESCRIPTION OF THE PREFERRED EMBODIMENT

Figure 1:
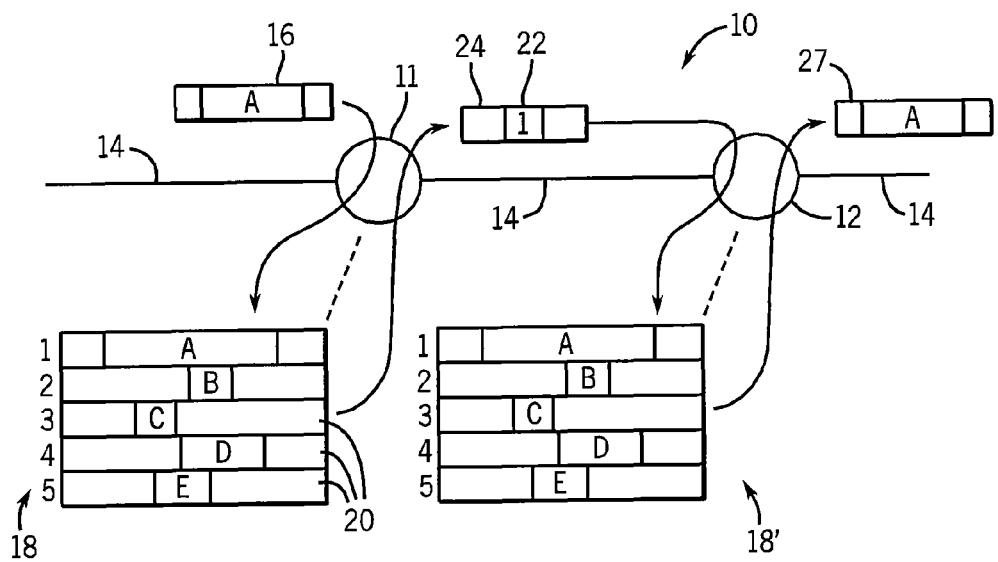
FIG. 1 is a simplified diagram of prior art redundancy-aware routers using look-up tables of cached antecedent packets at compressing nodes to remove redundant data through the insertion of a shim and using similar caches at decompressing nodes to restore the shimmed data.

Referring now to FIG. 1, a network 10 may include a set of network nodes 11 and 12 interconnected by media 14 defining paths between nodes 12. The media may be, for example, electrical cable, optical link, or radio link or the like.

A packet 16 with redundant payload information may arrive at a compressing node 11 which reviews the payload against a cache table 18 holding payloads for antecedent packets 20 previously passing through node 11. Payload data of the packets 20 (or portions of that data) in common with the payload data of instant packet 16 (here represented by the letter A) may be identified by a search of the table 18 and this "redundant" data A removed from the instant packet 16 and replaced by a shim 22 to create a compressed packet 24. The shim 22 may include a logical index number (here represented by 1), such as a hash, identifying the redundant information (A) within the cache table 18.

The compressed packet 24 may be received by a decompressing node 12 having a cache table 18' identical to cache table 18 which may be indexed using the index value (1) contained in the shim 22 to replace the shim 22 with the redundant information (A) to produce decompressed packet 27 identical to compressed packet 16.

Generally the process of compressing of node 11 is more demanding of hardware resources than the process of decompressing of node 12, principally because far more memory accesses are required to identify redundant data at node 11 than to find the indexed redundant data at node 12. Accordingly, in the simple topology shown in FIG. 1, compressing node 11 represents a bottleneck in data throughput.

Figure 2:
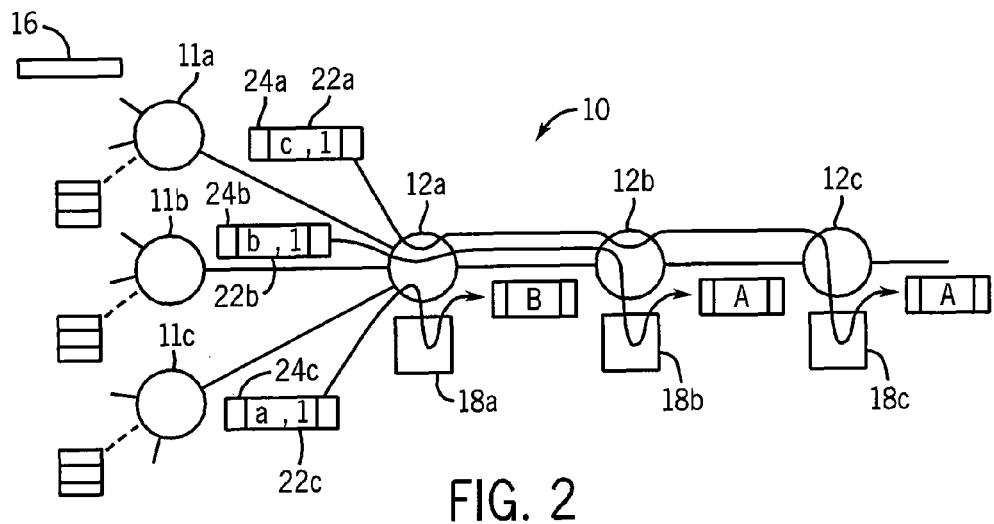
FIG. 2 is a figure similar to that of FIG. 1 showing the present invention's allocation of the decompressing of network packets among different decompressing nodes along a single path.

Referring now to FIG. 2, alternatively, multiple compressing nodes of 11a-11c may connect to a first decompressing node 12a creating a bottleneck at the decompressing node 12a caused by a "funneling in" of data to this interior node. In both cases, throughput may be compromised.

Referring still to FIG. 2, the present invention generally provides a method of flexibly yet systematically allocating decompression tasks to multiple decompressing nodes 12 not necessarily having direct connection to the compressing node 11. Using the present invention, the tasks of decompressing data from the nodes 11a-11c may be allocated over multiple different downstream nodes 12a-12c for improved load sharing even though compressing nodes 11a-11c (which may be ingress nodes of the network) are only connected directly to decompressing node 12a.

Thus, a first compressed packet 24a from compressing node 11a may have a shim 22a providing not only an index value (1) but also data (c), in this case, indicating that the decompression should be performed at decompressing node 12c. Likewise, second compressed packet 24b from compressing node 11b may have a shim 22b directing its decompression to occur at decompressing node 12b, and third compressed packet 24c may have a shim 22c directing its decompression to occur at decompressing node 12c. As will be described in more detail below, this allocation process may be controlled to conform to the topology of the system, the demands of network traffic, and the capabilities of the nodes 11 and 12.

In one embodiment of the invention, the cache tables 18a-c have different contents reflecting a similar allocation of cache responsibilities for "antecedent" data packets that fill the cache tables 18a-18c and that are used for the decompression. Generally, then, the responsibilities for decompressing compressed packets 24 will follow the responsibilities for caching the antecedent packets that will be used to decompress the packets 24. In one embodiment, the responsibility for caching is determined by a simple hashing of the header of the packet and a comparison of the hash value to preestablished ranges stored in each decompressing node 12 as a cache manifest.

Figure 3:
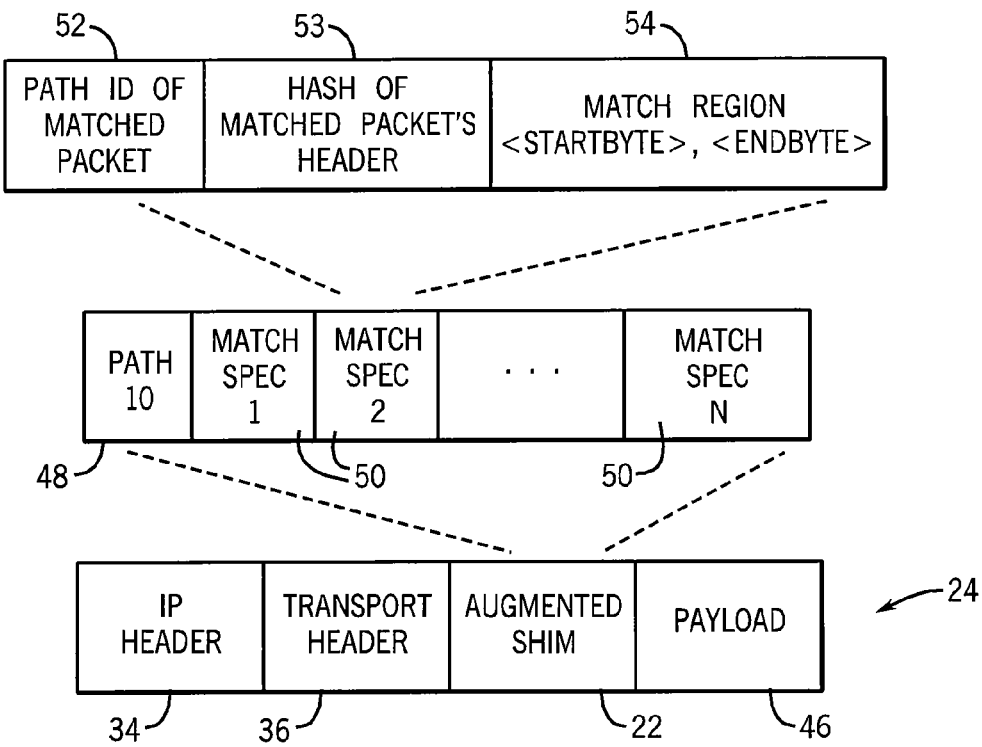
FIG. 3 is a diagram showing the compressed packets used in the process of FIG. 2.
Figure 6:
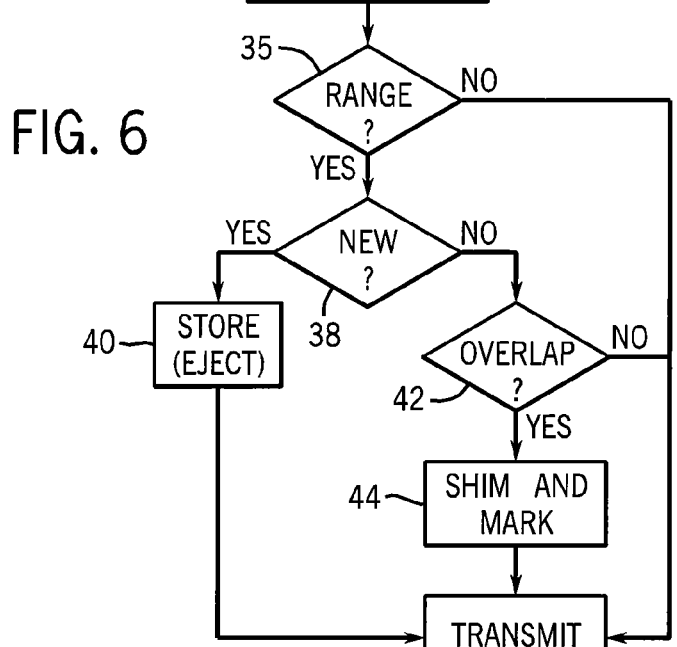
FIG. 6 is a flow chart of a program executed on the hardware of FIG. 5 for a decompressing node.

Referring now to FIGS. 2, 3 and 6, the invention may be implemented by a program 28 executed by the compressing node 11 receiving a new packet 16 as indicated by process block 30. Per process block 32, the header information of the packet 16, including the IP header 34 and transport header 36 as shown in FIG. 3, will be hashed to a value having a range, for example, between zero and one. The headers 34 and 36 generally include the source/destination IP address, port and protocol, and the Internet Protocol identification field, but can be any invariant field that does not change in the packet 16 as the packet is forwarded along the routing path from the compressing node 11 through the decompressing nodes 12.

At process block 35, the hash range is compared to a caching manifest representing the union of hash ranges that have been: (1) preassigned to each of the decompressing nodes 12a-12c communicating with the given compressing node 11 when the decompressing nodes 12a-12c were commissioned or (2) assigned dynamically by a supervisory node as will be described below. If the hash range is not within the caching manifest, then the packet 16 is forwarded without compression, as indicated by process block 37, because it will not be able to be decompressed by the downstream decompressing nodes.

Assuming that the hash range is within the caching manifest, then at decision block 38, it is determined whether the payload of the packet 16 matches an entry of cache table 18 of the compressing node 11. If not, then at process block 40, the payload is stored in the cache table 18 along with the hash value as an antecedent packet whose data may be used for the compression of later packets. The storage may be accompanied by the ejection of a previously stored payload value in a FIFO arrangement or other deterministic cache management technique. The packet is then transmitted at process block 37 uncompressed.

The process of identifying payloads within the cache table 18 and storing new payloads may use standard techniques known in the art of redundancy-aware devices or the technique described in co-pending application Ser. No. 12/418, 396 filed Apr. 3, 2009 by some of the inventor of the present application and hereby incorporated by reference.

If at decision block 38, a match is found between the new packet 16 and data in the cache table 18, then at decision block 42, the compressing node 11 evaluates an overlap table to determine whether decompressing nodes 12 previously having stored the matching packet (or packets) of the cache table 18 are along a single path from the compressing node 11. This is to ensure that the compressed packet can be decompressed by subsequent nodes as will be explained in detail below.

If at decision block 42 it is determined that the packet 16, once compressed by node 11, will be received by the necessary decompressing nodes 12, then at process block 44, the redundant information in the new packet 16 (found in the cache table 18) is removed and replaced with a shim. The shim will be shorter than the replaced data and thus this operation effects a compression of the packet 16. Once the compression is complete, the compressed packet 24 is transmitted at process block 37.

Referring now to FIG. 3, the shim 22 will typically replace only a portion of the payload 46 (unless there is a complete match between the current payload and the payload of an antecedent packet 20). Multiple shims may be inserted when there are multiple matches with the data of the cache table 18.

The shim 22 contains one or more matching specifications 50 representing information about the data of the cache table 18 replaced by the shim 22. The matching specification 50 may include the path ID 48 of the matched packet 52, unless this can be derived downstream by other means. The matching specification 50 also includes the hash 53 previously stored in the cache table 18, that is, the hash of the header information of the antecedent packet providing the matching data of the cache table 18. Also included in the specification 50 is a matching region 54 describing the portion of the payload of the antecedent packet matching the new packet 16 expressed in terms of start byte and end byte as will be used for reconstituting the compressed packet 24 at the decompressing node 12.

Figure 8:
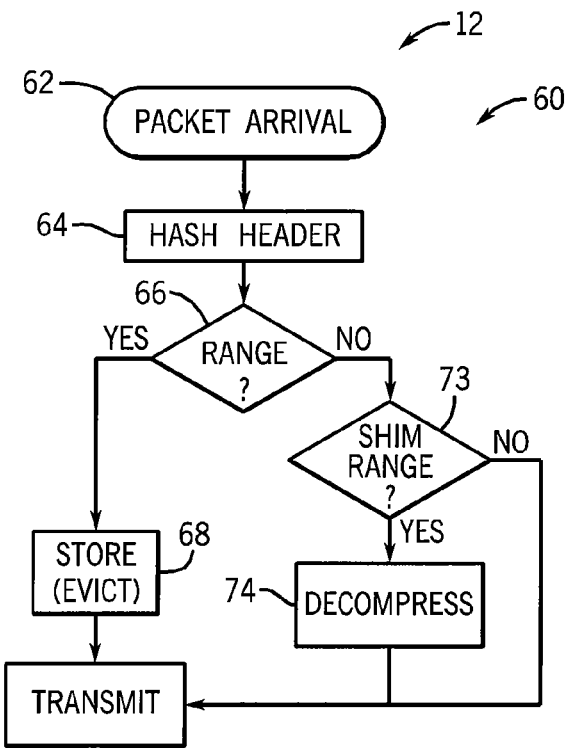
FIG. 8 is a flow chart of a program executed on the hardware of FIG. 5 for a decompressing node.

Referring now to FIG. 8, a program 60 executing on the decompressing nodes 12 may receive a new packet as indicated by process block 62 and may hash the header of the packet as indicated by process block 64 in a process similar to that described above with respect to process block 32. The result is compared to a caching manifest of the decompressing node 12 which describes a subset of the range of zero to one that will determine whether the particular decompressing node 12 will cache the packet for use in later decompression of the packet as will be described.

Figure 7:
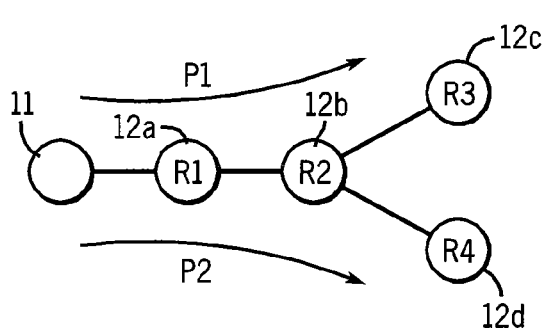
FIG. 7 is a simplified diagram of information contained in the overlap table of FIG. 6.

Referring momentarily to FIG. 7, each decompressing node 12 will have caching manifests with different disjoint ranges (depicted as R1-R4) so that only one node 12a-12d will be responsible for caching (and ultimately decompressing) a given shim of a packet.

Referring again to FIG. 8, if at decision block 66 the hash of the header of the arriving packet falls within the range assigned to the particular decompressing node 12 and is not a compressed packet (as indicated by a lack of shims), then at process block 68 the packet is stored in the cache table 18 (possibly with an eviction of a previously stored element) and the packet is retransmitted as indicated by process block 70.

If the hash of process block 64 is not within the range assigned to the given decompressing node 12 or the packet is compressed, then at decision block 73, the hash 53 of the shims of the packet (if the packet has been compressed) are also compared to the caching manifest used at decision block 66. If there is no match or no compression, the packet is transmitted without modification at process block 70.

If there is a match at decision block 73, then at process block 74, decompression is performed on the shims that have matching hashes per the process described with respect to FIG. 1.

Referring now to FIGS. 2, 6 and 7, for compressed packets 24 having multiple shims 22, decompression may be performed at multiple decompressing nodes 12a and 12b on a single path. On the other hand, decompression of compressed packets 24 having multiple shims 22 associated with different decompressing nodes 12 cannot be performed if the nodes 12 are on separate paths such as indicated by nodes 12c and 12d which are on separate paths P1 and P2. Accordingly, as described above at FIG. 6, decompressing node 11 provides an overlap table to ensure that all of the ranges of hashes 53 of the shims match to caching manifest of decompressing nodes 12 on a single path. If the decompressing nodes 12 are on multiple paths, the compression is not performed.

In the above described embodiment, a packet that is compressed by compressing node 11 is not stored in the cache table 18. Alternatively, compressing node 11 may store only portions of the packet that were not matched. Decompressing nodes 12 may employ a matching strategy.

Figure 4:
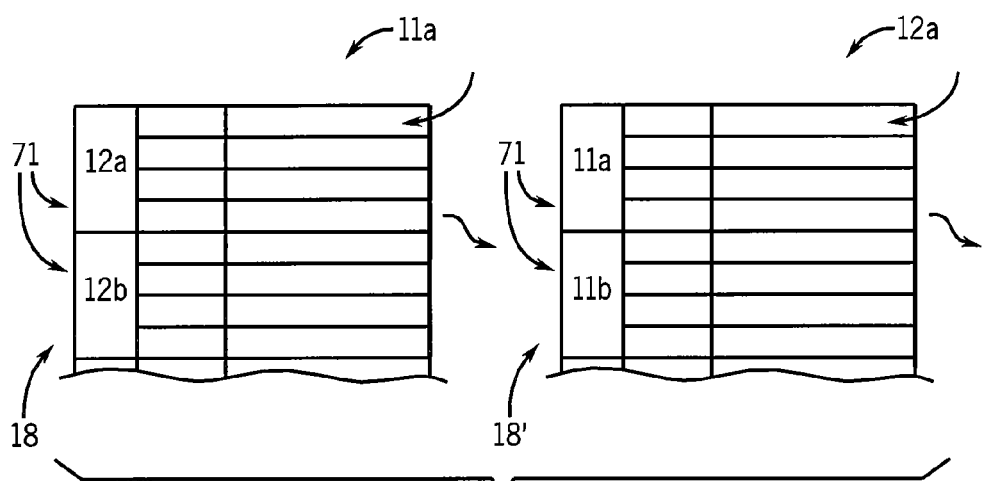
FIG. 4 is a diagram of the coordinated cache structures used in compressing nodes and decompressing nodes.

Referring now to FIG. 4, it is important for this system that the cache tables 18 at the compressing nodes 11 match those at the decompressing nodes 12 both in terms of their particular organizational structure and in terms of the content of the cache tables 18 at any time. This may be accomplished by dividing the cache tables 18 of the compressing nodes 11 and decompressing nodes 12 into sub-tables 71 each holding data associated only with a particular other corresponding node. Thus, for example, the compressing node 11a may have sub-table 71 (labeled 12a and 12b) used exclusively for different decompressing nodes 12a and 12b, respectively, while decompression node 12a may have sub-table 71 (labeled 11a and 11b) used exclusively for different compressing nodes 11a and 11b, respectively. The sub-table 71 labeled 12a of compressing node 11a is organized identically to and is of identical size to the sub-table 71 labeled 11a of decompressing node 12a so that the cache tables 18 fill and evict contents identically, to always be synchronized with each other.

Figure 9:
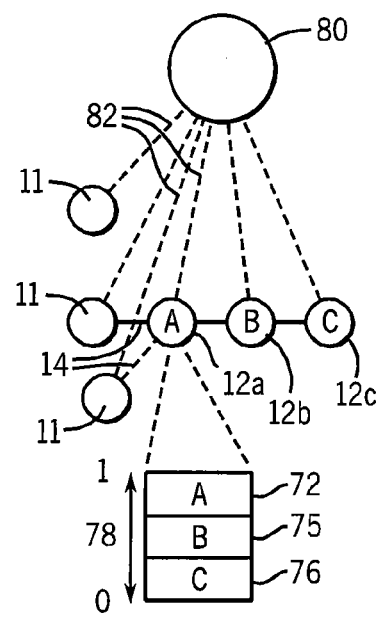
FIG. 9 is a schematic representation of the connection of the supervisory node to the compressing and decompressing nodes to provide hash ranges to the nodes.

Referring now to FIG. 9, the present invention admits to a supervisory node 80 that may logically communicate with the other nodes 11 and 12 as indicated by lines 82, for example, using special packets communicated over the network. This communication may permit the supervisory node 80 to collect information about the resources of each of the nodes 11 and 12, for example the size and speed of their memories and their processing speeds. Alternatively or in addition, the supervisory node 80 may collect network statistics indicating the amount of traffic handled by each of the nodes 11 and 12.

This information collected by the supervisory node 80 may be used by the supervisory node 80 to determine the caching manifests for the nodes 11 and 12 defining the relative hash ranges of the compressing nodes 12. Thus, for example, the hash range 72 of node 12a having limited resources and high traffic may be reduced with respect to the hash ranges 75 and 76 of nodes 12b and 12c having less traffic or greater processing resources. The hash ranges measured in terms of the range of the hash function 78 may be dynamically adjusted as traffic conditions change on a periodic basis or may be static and configured at the time of initialization. The supervisory node 80 may set the hash ranges or similar rule for allocating compression and decompression by applying network objectives such as maximum throughput, load leveling, capacity reserves, or the like against the data collected relating to current and historical traffic conditions.

Figure 10:
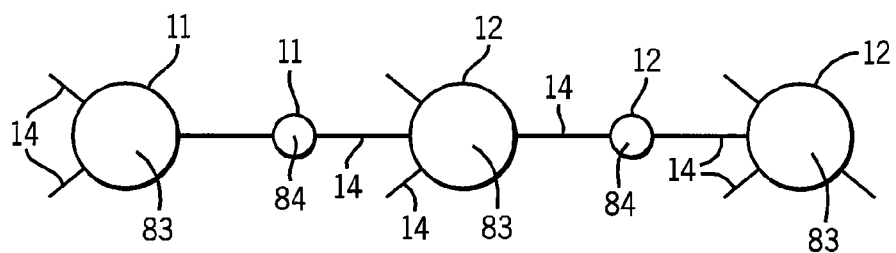
FIG. 10 is a network diagram showing implementation of the present invention on middle boxes.

Referring now to FIG. 10, the present invention may be implemented with the compressing nodes 11 and decompressing nodes 12 within routers 83 connected to multiple other devices through media 14, or maybe so-called "middle boxes" 84 positioned along a single run of the media 14 so as to intercept traffic along that path. Generally, a decompressing node and compressing node may be in the same device implementing different functions for different connections.

Figure 5:
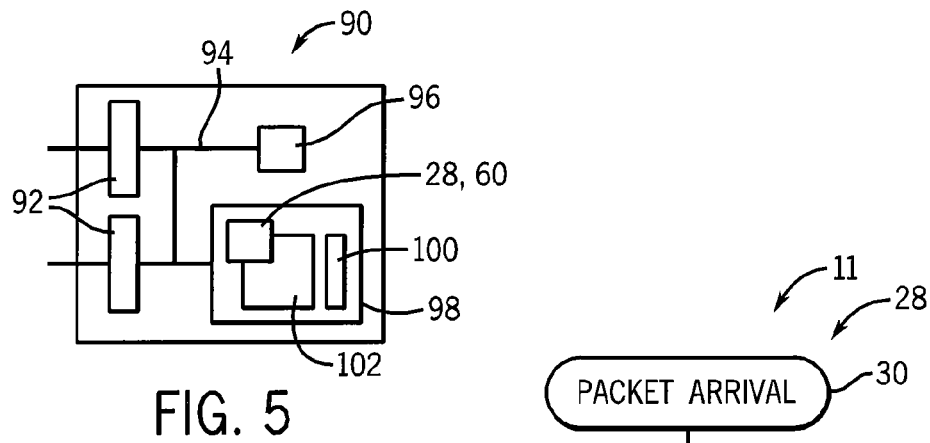
FIG. 5 is a block diagram of hardware suitable for implementing compressing or decompressing nodes.

Referring now to FIG. 5, an electronic computer 90 suitable for use in implementing the present invention may include one or more network cards 92, for example Ethernet cards, providing low-level network communications. The network cards 92 may connect by means of an internal bus 94 with a processor 96 and with a memory 98, the memory 98 holding, in the case of a router, a router program and table 100 and an operating system 102. Programs 28 or 60 or both may be stored in the memory together with the necessary cache manifests and overlap matrices to be executed by the processor 96 according to techniques well known in the art.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. An apparatus for reducing redundant network transmissions in a network, the apparatus comprising at least one compressing node and at least a first and second decompressing node along a transmission path from the at least one compressing node, packets from the at least one compressing node passing first through the first decompressing node and then to the second decompressing node, all nodes intercommunicating and spatially separated on the network;

wherein the at least one compressing node compresses redundant packets and marks them for decompression at different ones of the first and second decompressing nodes to spread the computational task of decompressing redundant packets among the first and second decompressing nodes;

wherein the first decompressing node receives packets marked for decompression by both the first and second decompressing nodes and selectively decompresses the received packets only when a given received packet is marked for decompression by the first decompressing node and performs that decompression before forwarding the given received packet to the second decompressing node.

2. The apparatus of claim 1 wherein first and second decompressing nodes selectively store portions of antecedent packets identified by using a predefined rule based on data in the antecedent packets that allocates storage of the portions of the antecedent packets among the first and second decompressing nodes; and wherein the at least one compressing node compresses redundant packets by identifying and excising portions of each given redundant packet that are redundant with a given stored portion of an antecedent packet previously passing through the at least one compressing node and wherein the at least one compressing node marks the given redundant packet for decompression at a given decompressing node previously storing the given stored portion of the antecedent packet according to the predefined rule.

3. The apparatus of claim 2 wherein the predefined rule assigns a range to each of the first and second decompressing node and hashes header data of the antecedent packets and stores those antecedent packets whose hash falls within the range assigned to a given first and second decompressing node.

4. The apparatus of claim 2 further including a supervisory node connecting for communication with at least one of the at least one compressing node and first and second decompressing nodes, the supervisory node providing data to the at least one of the at least one compressing node and the first and second decompressing nodes to control the predefined rule according to capabilities of the first and second decompressing nodes.

5. The apparatus of claim 4 wherein the capabilities are selected from a group consisting of: cache memory size for storing antecedent network packets, cache memory speed, and processor speed.

6. The apparatus of claim 2 further including a supervisory node connecting for communication with at least one of the at least one compressing node and first and second decompressing nodes, the supervisory node providing data to the at least one connected node to control the predefined rule according to network-wide objectives.

7. The apparatus of claim 6 wherein the network-wide objectives are applied to historical measurements of network traffic to control the predefined rule.

8. The apparatus of claim 2 wherein the at least one compressing node excises multiple portions of a given redundant network packet, the multiple portions redundant with portions of different antecedent network packets, and marks the given redundant network packet for decompression of different portions of the given redundant network packet at different ones of the first and second decompressing nodes.

9. The apparatus of claim 1 wherein the at least one compressing node includes a table describing a connection topology of the first and second decompressing nodes and wherein the at least one compressing node checks the table to ensure that the first and second decompressing nodes are on a same transmission path and not compressing different portions of a redundant packet for decompression at both the first and second decompressing nodes if the first and second decompressing nodes are not on the same transmission path.

10. The apparatus of claim 2 wherein the at least one compressing node includes a first storage area for storing portions of antecedent packets also for storage at the first decompressing node and a second storage area for storing portions of antecedent packets also for storage at the second decompressing node, and wherein the first and second decompressing nodes have storage areas equal in size to the first storage area and second storage area respectively, whereby ejection of stored data caused by overflow of the storage areas of the at least one compressing node causes synchronous ejection of stored data in the respective storage areas of the first and second decompressing nodes.

11. An apparatus for reducing redundant network transmissions in a network, the apparatus comprising at least one compressing node and at least a first and second decompressing node along a transmission path from the at least one compressing node, all nodes intercommunicating and spatially separated on the network;

wherein the at least one compressing node compresses redundant packets and marks them for decompression at different ones of the first and second decompressing nodes to spread the computational task of decompressing redundant packets among the first and second decompressing nodes;

wherein the first and second decompressing nodes selectively decompress packets according to whether the packets are marked for a particular first or second decompressing node;

wherein the first and second decompressing nodes selectively store portions of antecedent packets identified by using a predefined rule based on data in the antecedent packets that allocates storage of the antecedent packets among the first and second decompressing nodes; and wherein the at least one compressing node compresses redundant packets by identifying and excising portions of each given redundant packet that are redundant with a given stored portion of an antecedent packet previously passing through the at least one compressing node and wherein the at least one compressing node marks each given redundant packet for decompression at a given decompressing node previously storing the given stored portion of the antecedent packet according to the predefined rule; and wherein the first decompressing node further communicates with a second compressing node and wherein each of the at least one and second compressing nodes include a storage area for storing portions of antecedent packets marked for storage at the first decompressing node; and wherein the first decompressing node has first and second storage areas equal in size to the storage area of the at least one and second compressing nodes respectively;

whereby ejection of stored data caused by overflow of the storage area of the at least one and second compressing nodes causes synchronous ejection of stored data in the respective storage area of the first decompressing node.

12. The apparatus of claim 2 wherein the first and second decompressing nodes provide decompression of redundant packets only with respect to uncompressed portions of antecedent packets.

13. The apparatus of claim 1 wherein the at least one compressing node and the first and second decompressing nodes are portions of network routers.

14. The apparatus of claim 1 wherein the at least one compressing node and the first and second decompressing nodes are non-router middle boxes attached on a single network line.

15. An apparatus for reducing redundant data transmissions in a network, the apparatus comprising at least one compressing node and at least a first and second decompressing node connected in series along at least one transmission path from the at least one compressing node, packets from the at least one compressing node passing first through the first decompressing node and then to the second decompressing node, all nodes intercommunicating and spatially separated on the network and operating according to stored programs executed by electronic hardware;

wherein the at least one compressing node:
(a) receives and stores at least a portion of an antecedent network packet and marks the antecedent network packet for storage of the portion, at one of the first and second decompressing nodes according to a system distributing storage of different network packets from the at least one compressing node among ones of the first and second decompressing nodes;
(b) excises at least a portion of a subsequent network packet that is redundant with the stored portion of the antecedent network packet and marking the subsequent network packet for decompression by a same one of the first and second decompressing node as was marked to store the portion of the antecedent network packet;

wherein the first decompressing node:
(a) receives a given antecedent network packet and stores a portion of the given antecedent network packet as marked by the at least one compressing node for storage by the first decompressing nodes;
(b) receives a given subsequent network packet, which is subsequent to the given antecedent network packet; and
(c) restores a previously excised portion of the given subsequent network packet from the stored portion of the given antecedent network packet using the stored portion of the given antecedent network packet and then forwards the restored given subsequent network packet to the second decompressing node; and wherein the second decompressing node:
(a) receives a second given antecedent network packet from the first decompressing node and stores a portion of the second given antecedent network packet as marked by the at least one compressing node for storage by the second decompressing node;
(b) receives a second given subsequent network packet, which is subsequent to the second given antecedent network packet; and
(c) restores a previously excised portion of the second given subsequent network packet from the stored portion of the second given antecedent network packet using the stored portion of the second given antecedent network packet.

* * * * *